Jan. 14, 1941.　　W. SCHEESE ET AL　　2,228,850
SPEED INDICATOR
Filed May 22, 1939　　3 Sheets-Sheet 1

Inventor
William Scheese
W. W. Schwab
By Clarence A. O'Brien
and Hyman Berman
Attorneys Jan. 14, 1941.   W. SCHEESE ET AL   2,228,850
SPEED INDICATOR
Filed May 22, 1939   3 Sheets-Sheet 3
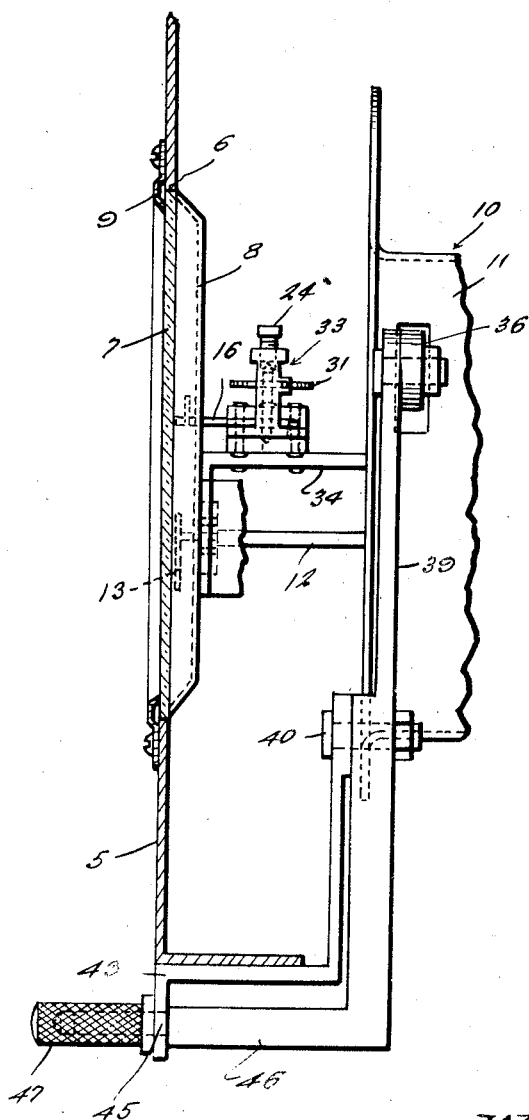
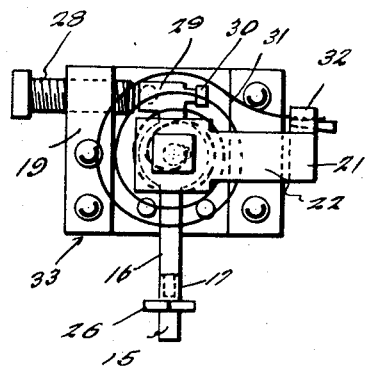
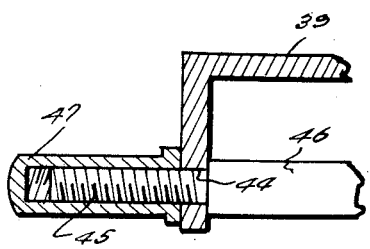
Inventor
William Scheese
W. W. Schwab
By Clarence A. O'Brien
and Hyman Berman
Attorneys Patented Jan. 14, 1941

2,228,850

UNITED STATES PATENT OFFICE 2,228,850

SPEED INDICATOR

William Scheese, White Horse, and W. Willard Schwab, Trenton, N. J.

Application May 22, 1939, Serial No. 275,066

2 Claims. (Cl. 200—56)

This invention appertains to new and useful improvements in speed signalling alarm means for speedometers such as used on automobiles and in fact, other vehicles.

The principal object of the present invention is to provide an alarm in combination with a speedometer to the end that when the speedometer indicating hand reaches a certain speed designated on the speedometer dial, an electrical alarm circuit will be completed to render to the driver an alarm or signal that he has reached and is about to exceed a certain speed.

Another important object of the invention is to provide a speed alarm for speedometers which can be set to operate at any speed desired.

These and various other important objects and advantages of the invention will become apparent to the reader of the following specification.

In the drawings—

Figure 3 is a vertical sectional view through the instrument board and dial.

Figure 4 is a sectional view on the line 4—4 of Figure 1.

Figure 5 is a top plan view of the contact assembly.

Figure 1:
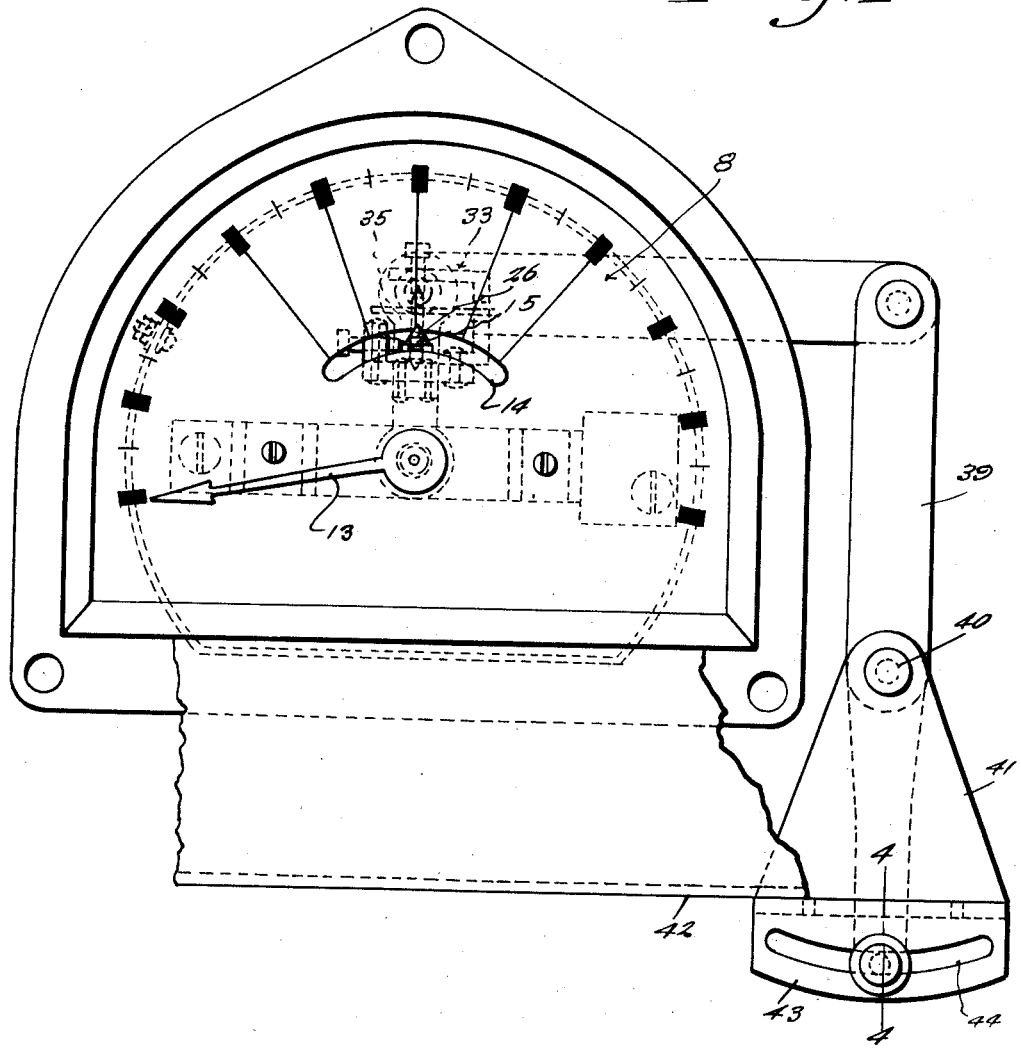
Figure 1 represents a front elevational view of a speedometer and the contact adjusting means.
Figure 2:
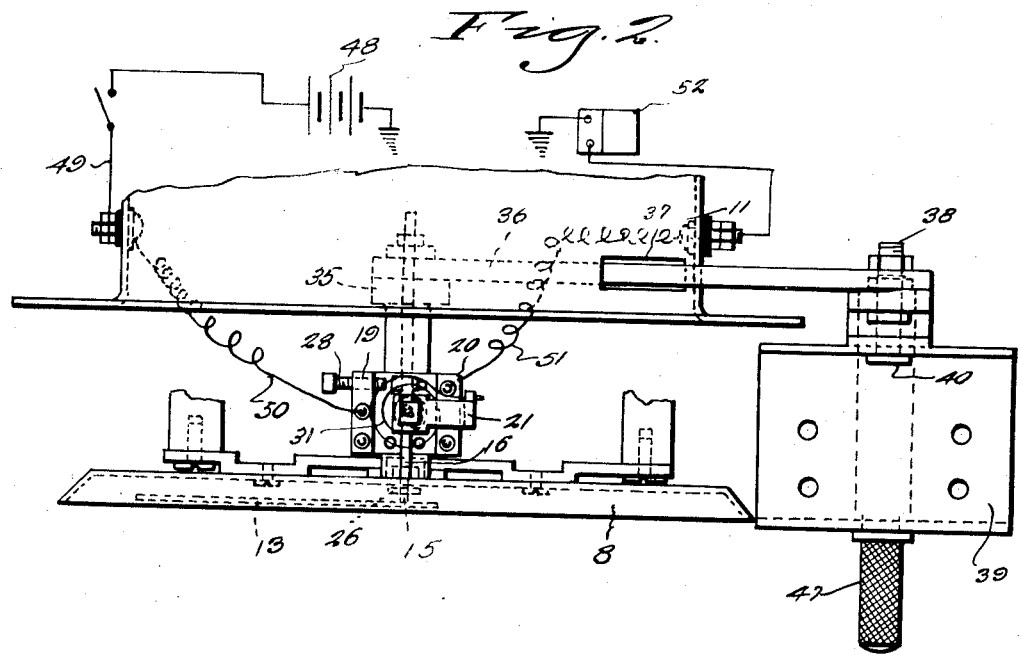
Figure 2 is a top plan view of the structure shown in Figure 1.

Referring to the drawings, wherein like numerals designate like parts, it can be seen that the numeral 5 represents the usual instrument board which has the opening 6 therein for receiving the window 7 for the speedometer dial 8, this window being held in place by the rim 9.

Numeral 10 generally refers to the speedometer mechanism of which the housing is denoted by numeral 11. The shaft 12 extends from the speedometer 10 through an opening in the dial 8 and carries the indicating hand 13.

The dial 8 just above the shaft 12 has the arcuate shaped slot 14 therein and through this projects the tip 15 of the arm 16, this tip preferably being of insulation and being detachably connected as at 17 to the arm 16.

Figure 6:
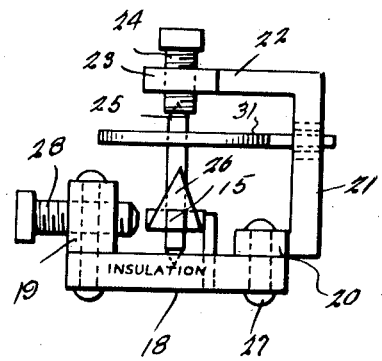
Figure 6 is a front elevational view of the contact assembly.
Figure 7:
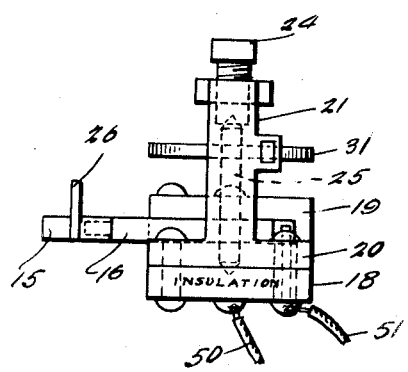
Figure 7 is a side elevational view of the contact assembly.

As is shown in Figure 6, numeral 18 denotes a plate of insulation on which is the bar 19 of current conductive material, also the bar 20 of like material. From the latter bar rises the post 21 which has the inwardly disposed arm 22 enlarged at its end overlying the plate 18 as at 23 and being bored to vertically receive the screw bearing 24 which is recessed to receive the upper conical end of the shaft 25. The lower conical end of the shaft 25 is seated in a suitable bearing in the plate 18.

The arm 16 projects from the shaft 25 and as is shown in Figures 5 and 6, the tip 15 carries a triangular shaped plate 26 serving as a pointer in conjunction with the dial plate 8.

The bars 19 and 20 are riveted as at 27 to the plate 18 and at one end, the bar 19 has the horizontally feedable screw contact 28 which is in the path of the contact member 29 carried by the shaft 25. The contact 29 operates between the contact screw 28 and the stop 30, and a coiled spring 31 having one end secured to the shaft 25 and its opposite end to the lug 32 on the post 21 serves to maintain the shaft 25 normally swung so that the contacts 29 will be engaging the upstanding stop 30 on the plate 18.

The thus described contact assembly generally referred to by numeral 33 is carried by the foot portion 34 of the plate 35 which depends from one end of the link 36. This link operates through the slot 37 in the side of the speedometer housing 11 and is pivotally connected as at 38 to the rocker 39, the arm 39 being rockably secured as at 40 to the substantially triangular shaped plate 41 which has an off-set portion for bearing under the flanged portion 42, to which it is secured by bolts or the like. The forward portion of this plate 41 is provided with a downwardly disposed flange 43 having the arcuate shaped slot 44 therein and this receives the forwardly extending reduced portion 45 of the arm 46, and a knurled nut 47 on the reduced portion 45 can be fed inwardly and against the flange 43 to secure the rocker 39 in any desired position for maintaining the contact 29 in the proper relationship with the dial 8.

It can be seen that when the contact assembly 33 is properly set, and the speedometer indicating hand 13 rides against the tip 15 and rotates the shaft 25 slightly, the contact 29 will leave the stop 30 and engage the contact screw 28 with the result that current will flow from the battery 48 along the conductor 49 and jumper 50 to the bar 19 and contact screw 28 and from there by way of the contact 29, and shaft 25 to the spring 31 and post 21 and from there by way of the bar 20 and jumper 51 to the buzzer or other alarm means 52, thus apprising the driver of the fact that he has approached and is about to exceed a certain predetermined speed limit.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

1. In combination with a speedometer having a dial and indicating hand, a shiftable contact assembly, said contact assembly including a stationary contact, a movable contact and an arm for actuating the movable contact, said arm being disposed in the path of the indicating hand, said contact assembly including a shaft, said shaft carrying the movable contact and having the arm projecting therefrom, said contact assembly including a plate of insulation, a post extending from the plate of insulation, a spring coiled around the shaft and having one end attached thereto and the other end attached to the post and a stop means on the plate of insulation against which the movable contact can engage.

2. A contact assembly for operating a signal and for attachment to a speedometer shaft having an indicating hand thereon, said assembly comprising a base plate, an angle bracket arising from one side of the plate and overhanging the same, an arm above said plate and having a front end for engagement by said hand, an arm supporting post upstanding from said plate and having needle point bearings in said plate and bracket, respectively, whereby said arm is mounted for oscillating movement and in one direction under engagement of said end by said hand, a contact screw on said plate, a contact on the rear end of said arm movable into engagement with said screw under movement of said arm in said one direction, a convolute spring fixed to said post and bracket, respectively, and thereby tending to move said arm in the opposite direction, a stop on said plate alongside said contact for limiting movement of said arm in said opposite direction, and means adapted to mount said plate on said shaft with the front end of the arm in the path of movement of said hand and for swinging adjustment of said plate about said shaft into different set positions.

WILLIAM SCHEESE.
W. WILLARD SCHWAB.